United States Patent [19]

Elsamanoudi

[11] Patent Number: 5,340,394
[45] Date of Patent: Aug. 23, 1994

[54] ZERO VOC TINTING CONCENTRATES FOR DECORATIVE PAINTS

[75] Inventor: Ahmed A. Elsamanoudi, Strongsville, Ohio

[73] Assignee: The Glidden Company, Cleveland, Ohio

[21] Appl. No.: 79,260

[22] Filed: Jun. 21, 1993

Related U.S. Application Data

[63] Continuation-in-part of Ser. No. 917,398, Jul. 23, 1992, abandoned.

[51] Int. Cl.$^5$ ............................................. C09D 101/28
[52] U.S. Cl. .................................... 106/500; 106/400; 106/401; 106/499
[58] Field of Search ................. 106/500, 499, 400, 401

[56] References Cited

U.S. PATENT DOCUMENTS

| | | | |
|---|---|---|---|
| 4,127,420 | 11/1978 | Harris et al. ................... | 106/412 |
| 4,154,706 | 5/1979 | Kenkare et al. ................ | 252/174.21 |
| 4,657,999 | 4/1987 | Hoefer et al. .................. | 106/412 |
| 5,160,654 | 11/1992 | Falou et al. .................... | 252/174.25 |

FOREIGN PATENT DOCUMENTS 861223 2/1961 United Kingdom .

Primary Examiner—Helene Klemanski
Assistant Examiner—Scott L. Hertzog
Attorney, Agent, or Firm—Thomas M. Schmitz

[57] ABSTRACT

An aqueous dispersed pigmented tinting concentrate particularly useful for tinting aqueous latex paints or non-aqueous solvent paints, the tinting concentrate comprising a low molecular weight polyethylene glycol polyether vehicle having a number average molecular weight between about 200 and 700 in conjunction with at least about 2% by weight non-ionic alkyl polyglycoside surfactant based on the total weight of pigment in the tinting composition.

29 Claims, 1 Drawing Sheet

ZERO VOC TINTING CONCENTRATES FOR DECORATIVE PAINTS

This is a continuation-in-part of copending application Ser. No. 917,398 filed Jul. 23, 1992 now abandoned.

This invention pertains to pigmented tinting concentrates (pigment dispersions) and more particularly to zero VOC (volatile organic compounds) tinting concentrates containing concentrated color pigments uniformly dispersed into an aqueous dispersion of low molecular weight polymeric vehicle useful for tinting air dry consumer latex paints and other consumer pigmented paints.

BACKGROUND OF THE INVENTION

Paint coatings are protective surface coatings applied to substrates and cured to form dry continuous films for decorative purposes as well as to protect the substrate. Consumer latex paint coatings are air-drying aqueous coatings applied primarily to architectural interior or exterior surfaces, where the coatings are sufficiently fluid to flow out, form a continuous paint film, and then dry at ambient temperatures to form continuous films. A paint coating is ordinarily comprised of an organic polymeric binder, pigments, and various paint additives. The polymeric binder acts as a fluid vehicle for the pigments and imparts rheological properties to the fluid paint coating. In dried paint films, the polymeric binder functions as a binder for the pigments and provides adhesion of the dried paint film to the substrate. The pigments may be organic or inorganic and functionally contribute to opacity and color in addition to durability and hardness. The manufacture of paint coatings involves the preparation of a polymeric binder, mixing of component materials, grinding of pigments in the polymeric binder, and thinning to commercial standards. High speed dispersers or dissolvers are used in the grinding step to disperse the pigments into the polymeric binder solution.

Most retail paint stores stock a wide variety of ready-mixed color pigmented latex paints for consumer use where the color pigments are dispersed into the paint during manufacturing at the paint plant. However, a significant proportion of color pigmented paint is custom tinted at the point of sale to match a particular non-standard color selected by the consumer. In essence, a tiny amount of concentrated tinting pigment colorant is added to a consumer white or pastel tinting base to obtain the desired custom made color. Typically a small fraction of a fluid ounce and as high as twelve ounces of one, two, or more, and typically three pigment colorant concentrations are added to one gallon of tinting base. The concentrated pigment colorants are thoroughly mixed into the white or pastel tinting base by vigorous automatic shaking or stirring to produce a customized tinted latex paint. Tinting bases comprise highly concentrated levels of pigment ground into grinding vehicle to provide a high PVC (pigment-volume-concentration) fluid pigment concentrate. The most common grinding vehicle used in tinting concentrates is a blend of ethylene glycol and water in conjunction with various surfactants. The effect of concentrated pigment colorants on the paint base can be considerable including paint viscosity changes, drying problems, and water sensitivity problems, which are problems frequently attributed to interaction of the ethylene glycol in the concentrated pigmented colorants and the paint base. Although ethylene glycol provides excellent compatibility for both oil and water based consumer paints with manageable rheology and good freeze-thaw stability, ethylene glycol unfortunately is a volatile solvent which produces concentrated pigment colorants with a high VOC on the order of about 3 to 5 pounds/gallon. VOC is a measure of volatile organic compounds in a paint composition according to U.S. EPA Rule 24. See also ASTM Manual Series MNL4 and ASTM D-3960 and ASTM D-2369-87. Ethylene glycol has been criticized recently as being a suspected toxic substance and/or an animal teratogen. The surfactant system conventionally used with the pigmented tinting concentrate colorants are primarily nonionic and amphoteric surfactants in combination with anionic surfactant. The primary nonionic surfactant is nonyl phenol ethoxylate which provides wetting, dispersing, and stabilization for the concentrated pigment colorant. However, nonyl phenoyl ethoxylate has been identified as a suspected toxic substance by being biodegradable to a toxic phenol by-product. Most of the low molecular weight polymers suggested or tried as replacement vehicles for ethylene glycol while maintaining the existing surfactant system have resulted in low rheology at low shear and dialatency at high shear. These problems caused mixing and dispensing problems due to poor compatibility between the vehicle carrier used and nonyl phenol ethoxylate surfactant.

Latex paints for the consumer market ordinarily are based on polymeric binders prepared by emulsion polymerization of ethylenic monomers. A significant source of residual odor in latex consumer paints is directly due to the coalescing solvent. One typical coalescing solvent ordinarily contained in commercial air dry latex paints is 2,2,4-trimethylpentanediol monoisobutyrate (Texanol). The odor associated with the gradual volatilization of this solvent is considered offensive to many consumers and quite often the odor lingers for days or weeks after the paint is applied and dried. Considerable research effort has been directed toward eliminating volatile organic compounds (VOC) from consumer paints and especially from latex paints to eliminate emission problems as well as the odor problems. Thus, an urgent need exists to eliminate consumer VOC problems with air dry decorative paints including zero VOC concentrated colorants for tinting the consumer paints.

The concentrated pigment colorants of this invention exhibit a highly desirable shear thinning rheological profile which essentially duplicates the existing commercial standard based on ethylene glycol. The environmental need to replace ethylene glycol was a difficult achievement since low molecular weight polymers selected to replace ethylene glycol resulted in low rheology profile at low shear end and dialatency at the high shear end of the rheology profile. This presents manufacturing problems as well as a major practical commercial problem in respect to dispensing the concentrated pigment colorants from existing dispensing machines in retail paint stores. Poor physical properties, unacceptable rheology and compatibility were problems primarily caused by poor compatibility of the vehicle carrier and existing surfactants based on nonyl phenol ethoxylate. British Patent No. 861,223 suggests pigment tinting compositions using certain glycols or polyoxyalkylene diols in association with non-ionic or anionic surface active agents as vehicles for the pigment.

It now has been found that organic solvent-free concentrated pigment colorants can be produced free of ethylene glycol and nonyl phenol ethoxylate surfactant, where such concentrated pigment colorants are compatible with current consumer latex paints or solvent paints as well as new experimental zero VOC, air dry latex paints. It has been found that certain narrow range, low molecular weight, polyethylene glycol polyethers in combination with a surfactant system based on alkyl polyglycoside non-ionic surfactant eliminate undesirable volatile organics while providing good pigment wetting, dispersing, and stability, along with good shear thinning rheology as well as long open dry times necessary to prevent nozzle blockage in dispensing canisters for the colorants at the point of sale. The low molecular weight polyether organic vehicle in conjunction with alkyl polyglycosides provides maximum flow, comparable rheology and better open dry time relative to prior art systems based on ethylene glycol vehicle and nonyl phenol ethoxylated surfactant, and further eliminates organic solvent emission and toxicity problems while maintaining proper drying, wide range compatibility, and good pigment wetting, within water dispersible latex paints without causing a VOC problem. The concentrated pigment colorants are similarly compatible with existing consumer latex paints and solvent paints as well as existing ethylene glycol based pigment concentrates thereby eliminating change over problems and the need for stocking duplicate pigment concentrates. The concentrated pigment colorants of this invention are easy to manufacture and are particularly suitable for dispensing through existing open nozzle canister dispensing machines. The concentrated pigment colorant of this invention advantageously minimizes toxicity, eliminates organic solvent emissions, exhibits proper humectency and hygroscopicity to insure proper drying as well as compatibility with existing water dispersed or solvent dispersed paints, good pigment wetting and dispersibility from current dispensing devices without contributing to VOC. These and other advantages will become more apparent by referring to the detailed description and illustrative examples of the invention.

SUMMARY OF THE INVENTION

Briefly, the concentrated pigment colorants of this invention are essentially free of volatile organic compounds and comprise low molecular weight polyethylene glycol polyether vehicles having a number average molecular weight between about 190 and 700 in combination with certain nonionic wetting agents and surfactants including at least 2% by weight non-ionic alkyl polyglycoside (based on pigment weight) to stably disperse color and extender pigments within the polyether vehicles at a PVC above about 20% and preferably between about 20% to 45%. The concentrated pigment colorants are compatible with aqueous dispersed paints as well as solvent paint and are particularly useful to produce custom tinted consumer paint products.

DETAILED DESCRIPTION OF THE INVENTION

Figure 1:
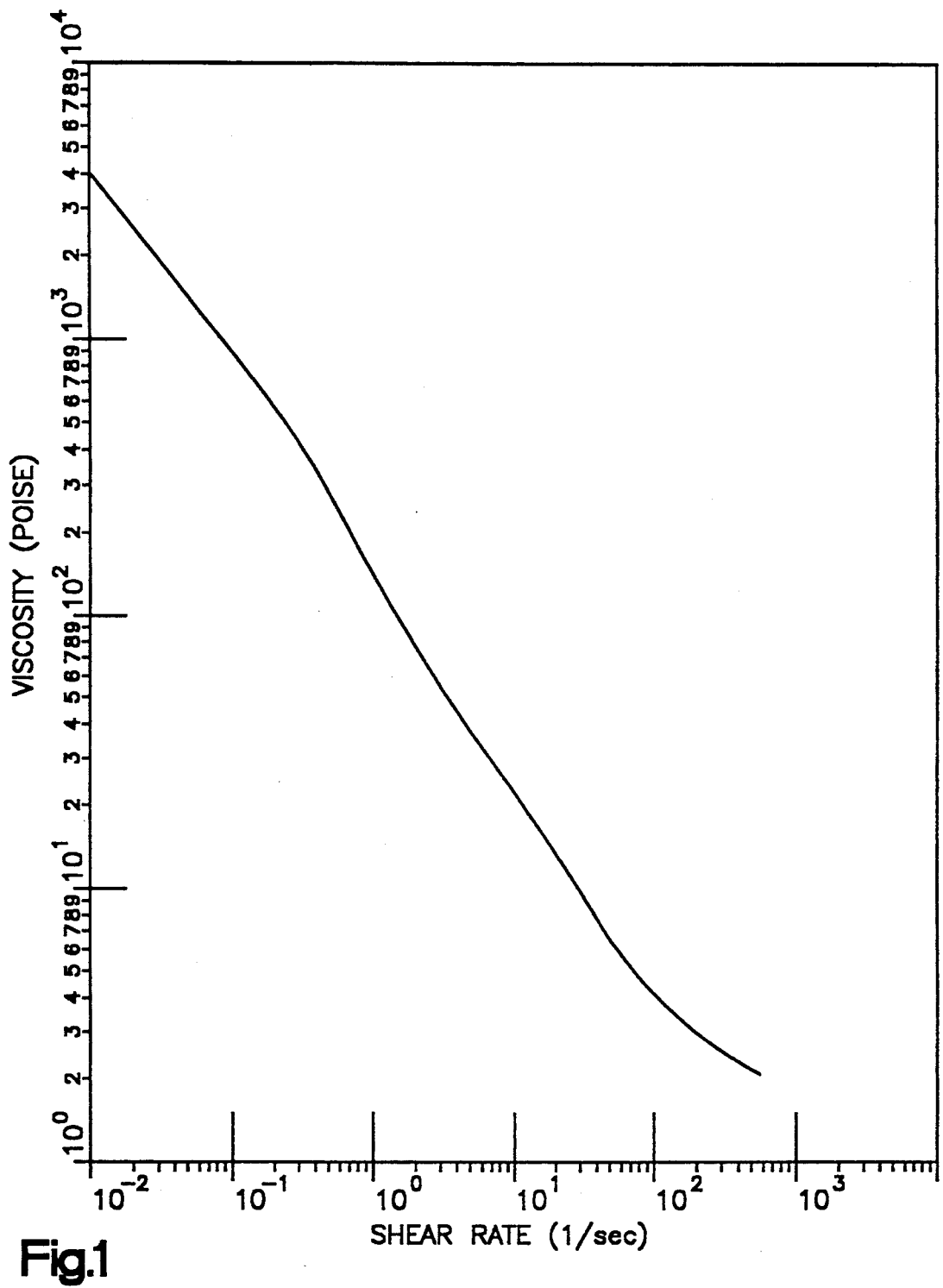
FIG. 1 is a rheology curve illustrating the viscosity-shear profile of the low molecular weight polyethylene glycol polyether used as a vehicle in the concentrated pigment colorant of this invention.

The concentrated pigment colorants of this invention are based primarily on low molecular weight polyethylene glycol polyether grinding vehicles in conjunction with a nonionic alkyl polyglycoside surfactant.

Referring first to the polyethylene glycol polyether, useful polyethers comprise a low molecular weight reaction product of ethylene oxide. In essence, polyethylene glycols are linear low molecular weight linear polymers formed by the addition homopolymerization reaction of ethylene oxides to produce a linear polymer structure as follows:

where n is equal to 4 or more but less than 17, desirably 4 to 14, and preferably between 6 and 9. Useful low molecular weight polyethylene glycols have a number average molecular weight above about 190 but below 700, desirably between 200 and 600, and preferably between about 300 and 600. Useful low molecular weight polyethylene glycols are substantially free of very low molecular weight volatile organic solvents. Lower molecular weight polyethylene glycols for instance, should contain less than about 0.2% by weight volatile organic glycols having a boiling point below about 285° C. Particularly useful commercial polyethylene glycols are Union Carbide PEG 300 having a molecular weight of about 300+/−15 and PEG 400 having a molecular weight of about 400+/−15. PEG 200 having a molecular weight of about 200+/−15 is useful provided that low molecular weight volatile organics such as triethylene glycol are essentially removed and to a level below about 0.2% by weight. Volatility can be measured as percent weight loss according to ASTM D-2369-87. Higher molecular weight polyethylene glycols or methoxy terminated polyethylene glycol or branch polyethylene glycols are all unsatisfactory due to flocculation and rheology problems with latex paints.

The non-ionic alkyl glycoside surfactant comprises an alkyl linked (alkylated) saccharide component where the saccharide component comprises a monosaccharide, or polysaccharide (oligosaccharide) condensation products of monosaccharides containing primarily two to five saccharides linked together with glycosidic linkages, or mixtures of monosaccharides and such polysaccharides, with minimal amounts, if any, of higher polysaccharides containing up to eight saccharide units. The saccharide component ordinarily comprises hexose six member rings but can include pentose five-member rings such as, for example, the disaccharide sucrose comprising a hexose ring linked to a pentose ring. The alkylated glycoside comprises an alkyl group linked to the saccharide component to provide an alkylated saccharide component. The alkyl group can be linked to the saccharide component by an intermediate linkage group where the preferred intermediate linkage groups are an ether group, an ester group, and a thio group, with the most preferred linking group being an ether group.

Preferred alkyl glycoside nonionic surfactant compounds comprise an aliphatic carbon chain attached by an ether linkage to a cyclic monosaccharide and/or a polysaccharide comprising a condensation product of two to five or more monosaccharide molecules and/or mixtures thereof. The alkyl polyglycosides can be formed by coreacting a fatty acid alcohol with a monosaccharide or polysaccharide in the presence of acid catalysts by a process known as Fischer Glycosidation. Carbohydrates can be processed into starch intermediates which are coreacted with $C_8$ to $C_{16}$ or higher fatty alcohols derived from coconut and palm kernal oils and animal fats processed by splitting and hydrogenation into the $C_8$ to $C_{16}$ fatty alcohols. The chemical structure of an alkyl polyglycoside is derived by replacing anomeric hydroxyl group with a long chain alkoxy group where the products formed are primarily monoglycosides and oligomeric glycosides with regressively decreasing amounts of diglycosides, triglycosides and higher glycosides.

Figure 2:
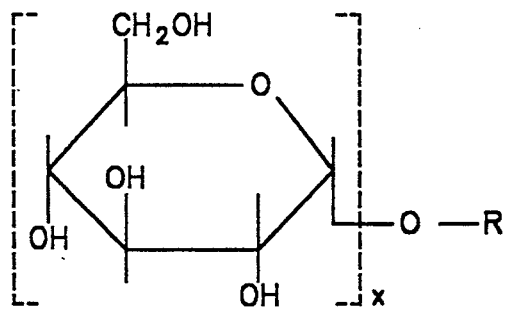
FIG. 2 is a chemical structure drawing of the preferred alkylpolyglycoside non-ionic surfactant useful in conjunction with the low molecular weight polyethylene glycol polyether vehicle.

Particularly preferred polyglycosides are formed by a linear ether connection through the methoxy group to provide a polyglycoside structure as shown in FIG. 2, and its isomers, where R is an alkyl group and X can be between 1 and 5 and the resulting glycoside mixture typically comprising by weight above about 50% and generally between 50% and 70% monoglycoside, between about 20% and 30% diglycoside, between about 5% and 10% triglycoside, with the balance, if any, being minor amounts up to about 10% of higher polyglycosides where $x=4$, 5, or 6, with minimal amounts, if any, where x is 7 or 8. In preferred compositions, R comprises alkyl aliphatic chains of $C_NH_{2N+1}$ where N is from 8 to 16. The HLB of the alkyl polyglycosides is ordinarily between 10 and 14. At room temperature, alkyl polyglycosides are high temperature melting hydroscopic solids ordinarily supplied commercially as aqueous solutions typically ranging from about 50% to 70% by weight solids.

Useful raw materials used in the manufacture of alkylpolyglycosides are corn derived carbohydrates and fatty alcohols derived from natural oils found in animals, coconuts and palm kernals although synthetic equivalents can be used. Carbohydrates comprising starch can be reacted under acidic conditions with a fatty alcohol by a condensation polymerization to form alkylpolyglycosides. Alkylpolyglycosides derive the name from the alkyl carbon chain and sugar derivatives of various degrees of polymerization or polyglycoside. Structurally, the alkylpolyglycoside molecule contains a hydrophilic group derived from corn based carbohydrates and is composed of one or more anhydroglucose units. Each glucose unit contains two ether oxygens and three hydroxyl groups plus a terminal hydroxyl group. Water solubility results from hydrogen bonding interactions with these hydroxyl groups. The hydrophobic portion of the molecule resides in the alkyl carbon and hydrogen chain. During the reaction of starch molecules with fatty alcohol molecules, alkylpolyglycoside molecules are formed which have single or multiple anhydroglucose units termed monoglucosides and polyglycosides, respectively. A distribution of varying concentrations of anhydroglucose units or degree of polymerization is present in the final alkylpolyglycoside product. As the average degree of polymerization increases, the water solubility of alkylpolyglycoside mixture increases due to increased hydroxyl groups. Commercially available alkyl polyglycosides are manufactured by Henkel Corporation and Union Carbide which produces a line of alkylpolyglycosides containing $C_8$ to $C_{16}$ alkyl chain length and an average degree of polymerization of about 1.4 to 1.6. Degree of polymerization (average DP) is the average ratio of saccharide structures to alkyl groups where DP ordinarily is between 1.4 and 1.7, where higher DP's indicate higher average saccharide (hydrophile) content. Typically the DP is controlled to an indicated $DP+/-0.02$. Alkyl polyglycosides are nonionic surfactants since the hydrophilic portion bears no charge when solubilized in water. The HLB of the surfactants mixture is predominantly between about 10 and 14 with only very minor amounts of high DP components having an HLB below 10. Alkyl polyglycoside surfactant is added at a level above 2% and preferably between 2.5% and 7% based on the weight of dry pigments in the tinting pigment dispersion.

In a similar manner, thioglycosides are sulfur analogues of glycosides in which the alkyl linked oxygen is replaced by an intermediate sulfur linkage. In this regard, a thio alcohol can be reacted with a saccharide component to produce a thioglycoside. Similarly, an intermediate ester linkage can link the alkyl chain to the saccharide component by reacting the saccharide component with a fatty acid such as a $C_8$ to $C_{30}$ alkanoic acid.

Other surfactants can be used as a co-surfactant in conjunction with alkyl polyglycoside and can include, for instance, non-ionic co-surfactants such as polyethoxylene glycol monolaurate and/or polysorbate surfactants, amphoteric surfactant such as soya lecithin which performs as a rheological stabilizer. Non-ionic cosurfactants are particularly useful at higher PVC's and especially useful at PVC's above 45%. Such co-surfactants are used in conjunction with polyglycoside surfactant where the total surfactant is above 2% and preferably between 6% and 10% by weight percent based on the weight of the dry pigments. An anionic dispersant such as polymeric acrylate can be added and used as a dispersant (grinding aid).

In the consumer decorative painting market, common tinting pigments are required for both water and hydrocarbon dispersed paints. The concentrated pigment colorants of this invention require tinting pigments which typically include black, white, organic red, organic yellow, inorganic red, inorganic yellow, and organic blue as well as violet, orange, green, brown and other hues of organic yellow and red. Tinter strength is related to PVC (pigment volume concentration) and higher pigment concentrations are preferred to achieve the deep colors although reduced strength tinters are frequently maintained to obtain accurate tinting for pale or light shades. Useful tinting or tinctorial pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, copper phthalo cyanine green and blue, DNA orange (dinitroaniline orange #5), carbon black, lampblack, toluidine red, parachlor red, (burnt red and maroon red) hansa yellows which are azo coupling of metapara nitrotoluidiene and quinacridone red, magenta and violet. Tinctorial pigments comprise between 5% and 60% on dry solid weight basis.

Opacifying pigments can be added to the concentrated pigment colorant of this invention, if desired, to provide a white tinter. For purposes of this invention, white opacifying pigments are considered to be tinting pigments. Opacifying pigments are generally pigments having a refractive index of at least about 1.8. Typical white opacifying pigments include rutile and anatase titanium dioxide. The preferred white inorganic opacifying pigment is rutile titanium dioxide having a weight average particle size between about 0.2 to 0.4 microns. Although most opacifying pigments are white, all opacifying pigments have a high index of refraction above about 1.8 regardless of its tinting (tinctorial) effect on the resulting paint film. Opacifying pigments comprise between about 30% and 60% on a dry solids weight basis to provide a white tinting concentrate.

The concentrated pigment colorants can further contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigment other than opacifying pigment. Filler and extender pigments generally should not be above 15 microns in effective diameter for painting purposes and generally are of particle size not substantially larger than 5 microns for use in concentrated pigment colorants. Filler and extender pigments can comprise between about 5% and 50% on a dry solids weight basis.

The tinting pigment dispersions of this invention ordinarily contain filler/extender pigments as well as the tinting pigments to provide an aqueous dispersed tinting composition having a preferred PVC (pigment volume content) between about 20% and 45%. The PVC can be above 45%, if desired, and as high as 70% in some instances. The tinting pigment dispersion preferably contains between about 10% and 30% by weight water in the total composition.

Pigmented concentrates produced using low energy equipment such as Cowles dissolvers and vertical sandmills. The most suitable rheology for processing color concentrates using this type of manufacturing equipment is shear thinning, where viscosity decreases by increasing shear rate. This prevents splashing of the pigmented concentrates during processing and still allows sufficiently high viscosity for manufacturing by mixing and dispersing of the pigments.

These resulting pigment concentrates are dispensed volumetrically in stores to tint consumer trade sales paints. The dispensing equipment can be either automatic or manual, although the most popular are the manual dispensing machines, for example, the Harbil machine. These machines consist of a canister and a tri-valve pump where material is pulled into the piston from the canister and then dispensed through a 3 mm orifice. The shear rate of the dispense has been calculated based on the diameter of the nozzle orifice (3 mm) and the rate of the dispense of the concentrate. The shear rate was calculated to be 300 sec$^{-1}$.

The merits of this invention are further illustrated in the following examples where in all percentages are by weight unless otherwise indicated.

EXAMPLES

Rheology studies were performed on lab samples produced using standard laboratory procedures. The samples were acceptable for color and tint base compatibility. The actual flow curves were characterized using the cone and plate rheometer and the Carri-Med computer system. These resultant curves were compared to freshly prepared controls which represent the current prior art formulations based on ethylene glycol vehicles in conjunction with nonyl phenol ethoxylate surfactant. The test procedure was as follows:

A 4 cm diameter, 2° cone was used at a temperature of 25° C. The test protocol for pigment dispersions is to run four flow curves on a given specimen in succession. First a procedure designated "coil low" is run, in which the torque starts at zero and increases linearly to a maximum torque of 5000 dyne-cm (equivalent to a shear stress of 298 dyne/cm$^2$) over a period of 2 minutes, then decreases linearly back to zero over the same time period. This is run following a 30 second initial equilibration period after the specimen is applied to the instrument. Following this run, a second run is performed on the same specimen, using the same procedure (coil low), except that the equilibration period is increased to 15 minutes, an arbitrary time period to allow the sample to recover its rest structure. Next, a third run on the same specimen is performed using a procedure called "coil high" which works exactly like coil low, except that the maximum torque reached is in the range of 35,000 to 100,000 dyne-cm, depending on what the consistency of the dispersion specimen happens to be. Also, no equilibration period is used. The final run is a repeat of the third run, the purpose being to see whether the first high-torque run was sufficient to break down the structure completely, or if further breakdown will occur on a second high-shear experience. All tests were performed on the same specimen of material in that the sample is not cleaned off and replaced with a fresh one between procedural steps. The rheological test results of the pigmented tinting concentrates of this invention essentially follow the curve profile shown in FIG. 1.

Color and compatibility of each pigment concentrate dispersion were evaluated for color and compatibility in tint bases. An amount of tint base equal to the desired weight per gallon times a factor of 27.5 was weighed into a half pint can. Then an amount of colorant of both the standard and batch equal to the desired weight per gallon times a factor of 0.444 was accurately weighed into a half pint of the tint base under test. Each can was stirred with a spatula thoroughly and then shaken for five minutes on a Red Devil paint shaker. Both standard and batch were drawn down side by side on a Leneta form WB using a 6 mil bird film applicator. After the drawdowns were dried thoroughly at room temperature, the color difference was evaluated both visually and spectrophotometrically using the ACS color computer and spectrophotometer. Acceptable tint strength and color development resulted with negligible deviation from the standard paint color.

In all the examples listed below, all dispersions for colorants were prepared by using the indicated ingredients to formulate nonyl phenol ethoxylate (NPE) free zero VOC colorants. The colorants were tested in canisters for ease of dispensing which was judged by the pressure required to make the colorants flow through an open nozzle. The results were reported as either easier to dispense or more difficult to dispense than Glidden DRAMATONE® colorant standard (e.g. colorant) based on ethylene glycol vehicle and nonyl phenol ethoxylate surfactant. The accuracy of the dispensing measured small volumes was also tested by dispensing a small increment (4/64 fluid oz.) three times a day for 3 consecutive days. The weight of the dispensed colorants were compared to the theoretical weight of an equal volume. An accurate dispense was determined as +/−3.0% of the theoretical.

These colorants were also used to tint trade sales interior and exterior latex paints of different gloss levels. Six ml. films were applied on Leneta charts, tested for flocculation, and measured for color difference versus the DRAMATONE® control colorants. Acceptable color difference was defined as 1.0 CIE lab unit.

EXAMPLE 1

Carbon black pigment (PB-7) was dispersed in each of the pigment carriers (organic vehicle) which consisted of one of the polyether series (PEG 200, PEG 300, or PEG400), water, polyglucoside and co-surfactant (sorbitol) blend, and then compared to the ethylene glycol control as follows:

| Composition | | | | |
|---|---|---|---|---|
| Vehicle (pigment carrier) | PEG 200 | PEG 300 | PEG 400 | Ethylene Glycol |
| Vehicle % | 20.00 | 20.00 | 20.00 | 20.00 |
| Water | 20.72 | 20.72 | 20.72 | 20.72 |
| Nonyl phenol ethoxylate | 0 | 0 | 0 | 5.00 |
| Alkyl polyglucoside | 5.00 | 5.00 | 5.00 | 0 |
| Co-surfactants | 3.14 | 3.14 | 3.14 | 3.14 |
| Soya lecithin | 3.03 | 3.03 | 3.03 | 3.03 |
| Glycerine | 3.00 | 3.00 | 3.00 | 3.00 |
| Biocide | 0.30 | 0.30 | 0.30 | 0.30 |
| Extender pigment (clay) | 39.50 | 39.50 | 39.50 | 39.50 |
| Pigment black | 5.31 | 5.31 | 5.31 | 5.31 |
| | 100.00% | 100.00% | 100.00% | 100.00% |
| Weight lbs. per gallon | 12.43 | 12.43 | 12.44 | 12.42 |
| PVC (pigment volume concentration) | 42.74 | 42.74 | 42.74 | 64.15 |
| VOC (volatile organic cmpds) | | | | |
| #/gal | 0 | 0 | 0 | 3.42 |
| gms/liter | 0 | 0 | 0 | 410.00 |
| Pigment weight (colored & extender) | 44.81 | 44.81 | 44.81 | 44.81 |
| Pigment volume (colored & extender) | 29.46 | 29.46 | 29.46 | 29.46 |

EXAMPLE 2

Red oxide pigment Red 101 was dispersed in each of the pigment carriers (organic vehicle) which consisted of one of the polyether series (PEG 200, PEG 300, or PEG 400), water, and surfactant blend then compared to the ethylene glycol control as follows:

| Composition | | | | |
|---|---|---|---|---|
| Vehicle (pigment carrier) | PEG 200 | PEG 300 | PEG 400 | Ethylene Glycol |
| Vehicle % | 18.00 | 18.00 | 18.00 | 18.00 |
| Water | 12.28 | 12.28 | 12.28 | 12.28 |
| Nonyl phenol ethoxylate | 0 | 0 | 0 | 2.50 |
| Alkyl polyglucoside | 2.50 | 2.50 | 2.50 | 0 |
| Co-surfactants | 2.20 | 2.20 | 2.20 | 2.20 |
| Soya lecithin | 2.50 | 2.50 | 2.50 | 2.50 |
| Glycerine | 2.50 | 2.50 | 2.50 | 2.50 |
| Biocide | 0.25 | 0.25 | 0.25 | 0.25 |
| Extender pigment (clay) | 26.00 | 26.00 | 26.00 | 26.00 |
| Red Oxide PR101 | 33.77 | 33.77 | 33.77 | 33.77 |
| | 100.00% | 100.00% | 100.00% | 100.00% |
| Weight lbs. per gallon | 15.77 | 15.77 | 15.77 | 15.77 |
| PVC | 34.24 | 34.24 | 34.24 | 69.99 |
| VOC (volatile organic cmpds) | | | | |
| #/gal | 0 | 0 | 0 | 3.63 |
| gms/liter | 0 | 0 | 0 | 435.00 |
| Pigment weight (colored & clay) | 59.77 | 59.77 | 59.77 | 59.77 |
| Pigment volume (colored & clay) | 24.81 | 24.81 | 24.81 | 24.81 |

EXAMPLE 3

Hansa Yellow 74 pigment was dispersed in each of the pigment carriers (organic vehicle) which consisted of one of the polyether series (PEG 200, PEG 300, and PEG 400), water, and surfactant blend then compared to ethylene glycol control as follows:

| Composition | | | | |
|---|---|---|---|---|
| Vehicle (pigment carrier) | PEG 200 | PEG 300 | PEG 400 | Ethylene Glycol |
| Vehicle % | 23.00 | 23.00 | 23.00 | 23.00 |
| Water | 23.30 | 23.30 | 23.30 | 23.30 |
| Nonyl phenol ethoxylate | 0 | 0 | 0 | 7.00 |
| Alkyl polyglucoside | 7.00 | 7.00 | 7.00 | 0 |
| Co-surfactants | 1.40 | 1.40 | 1.40 | 1.40 |
| Glycerine | 2.00 | 2.00 | 2.00 | 2.00 |
| Biocide | 0.30 | 0.30 | 0.30 | 0.30 |
| Extender pigment (clay) | 23.00 | 23.00 | 23.00 | 23.00 |
| Hansa Yellow 74 | 20.00 | 20.00 | 20.00 | 20.00 |
| | 100.00% | 100.00% | 100.00% | 100.00% |
| Weight lbs. per gallon | 11.10 | 11.11 | 11.13 | 11.10 |
| PVC | 42.31 | 42.31 | 42.31 | 60.37 |
| VOC (volatile organic cmpds) | | | | |
| #/gal | 0 | 0 | 0 | 3.70 |
| gms/liter | 0 | 0 | 0 | 444.00 |
| Pigment weight (colored & extender) | 43.00 | 43.00 | 43.00 | 43.00 |
| Pigment volume (colored & extender) | 29.09 | 29.09 | 29.09 | 29.09 |

EXAMPLE 4

Black pigment concentrates prepared from Example 1 (based on polyethers PEG 200, PEG 300, PEG 400, and alkyl polyglucoside surfactant system) were used to tint Glidden latex tint base Y3418, Glidden semi-gloss alkyd tint base Y4618, and experimental zero VOC latex tint base Y7800 using the standard black pigment concentrate (based on ethylene glycol as pigment carrier and nonyl phenol ethyoxylate surfactant system) as a control. The color differences were found to be as follows:

| Tint base Used | Pigment Carrier Used | Delta L Lightness Difference | Delta C Chroma Difference | Delta E Total Difference |
|---|---|---|---|---|
| Latex tint base Y3418 | PEG 200 | −0.24 | 0.15 | 0.29 |
| | PEG 300 | −0.52 | 0.16 | 0.54 |
| | PEG 400 | −0.55 | 0.22 | 0.59 |
| Alkyd tint base Y4618 | PEG 200 | −0.54 | 0.04 | 0.54 |
| | PEG 300 | −0.08 | 0.04 | 0.54 |
| | PEG 400 | 0.60 | 0.05 | 0.60 |
| Zero VOC tint base Y7800 | PEG 200 | 0.45 | 0.12 | 0.47 |
| | PEG 300 | 0.17 | 0.07 | 0.18 |
| | PEG 400 | 0.24 | 0.15 | 0.28 |

EXAMPLE 5

Similar to Example 4, red oxide pigment concentrates prepared from Example 1 (based on polyethers PEG 200, PEG 300, PEG 400, and alkyl polyglucoside surfactant system) were used to tint Glidden latex tint base Y3418, Glidden semi-gloss alkyd tint base Y4618, and experimental zero VOC latex tint base Y7800 using the current standard red oxide concentrate (based on ethylene glycol as pigment carrier and nonyl phenol ethoxylate surfactant) as a control. The color differences were found to be as follows:

| Tint base Used | Pigment Carrier Used | Delta L Lightness Difference | Delta C Chroma Difference | Delta E Total Difference |
|---|---|---|---|---|
| Latex tint base Y3418 | PEG 200 | −0.43 | 0.51 | 0.76 |
| | PEG 300 | −0.26 | −0.09 | 0.29 |
| | PEG 400 | −0.21 | 0.15 | 0.29 |
| Alkyd tint base Y4618 | PEG 200 | −0.46 | 0.75 | 0.96 |
| | PEG 300 | −0.43 | 0.09 | 0.46 |
| | PEG 400 | −0.36 | 0.80 | 1.02 |
| Zero VOC tint base Y7800 | PEG 200 | −0.19 | 0.48 | 0.57 |
| | PEG 300 | −0.08 | −0.31 | 0.41 |
| | PEG 400 | 0.07 | −0.14 | 0.17 |

EXAMPLE 6

Hansa Yellow 74 pigment concentrates prepared from Example 3 (based on polyethers PEG 200, PEG 300, PEG 400, and alkyl polyglucoside surfactant system) were used to tint Glidden latex tint base Y3418, Glidden semi-gloss alkyd tint base Y4618, and experimental zero VOC latex tint base Y7800 using the standard yellow pigment concentrate (based on ethylene glycol as pigment carrier and nonyl phenol ethoxylate surfactant system) as a control. The color differences were found to be as follows:

| Tint base Used | Pigment Carrier Used | Delta L Lightness Difference | Delta C Chroma Differenc | Delta E Total Difference |
|---|---|---|---|---|
| Latex tint base Y3418 | PEG 200 | −0.50 | 0.34 | 0.45 |
| | PEG 300 | −0.20 | −0.01 | 0.03 |
| | PEG 400 | −0.03 | 0.35 | 0.35 |
| Alkyd tint base Y4618 | PEG 200 | −0.02 | 0.51 | 0.57 |
| | PEG 300 | 0.07 | −0.11 | 0.20 |
| | PEG 400 | 0.04 | 0.43 | 0.47 |
| Zero VOC tint base Y7800 | PEG 200 | −0.05 | 0.54 | 0.59 |
| | PEG 300 | −0.05 | 0.37 | 0.38 |
| | PEG 400 | −0.00 | 0.38 | 0.39 |

EXAMPLE 7

In a manner similar to Examples 1–3, a high concentration red oxide pigment dispersion was produced using PEG 400 as the pigment dispersion vehicle.

| Block Composition | | |
|---|---|---|
| Vehicle (pigment carrier) | PEG 400 | Ethylene Glycol |
| Vehicle % | 10.00 | 10.00 |
| Water | 10.45 | 10.45 |
| Nonyl phenol ethoxylate | 0 | 3.00 |
| Alkyl polyglucoside | 3.00 | 0 |
| Co-surfactants | 5.50 | 5.50 |
| Soya lecithin | 2.00 | 2.00 |
| Glycerine | 2.50 | 2.50 |
| Biocide | 0.25 | 0.25 |
| Red Oxide | 66.30 | 66.30 |
| | 100.00% | 100.00% |
| Weight lbs. per gallon | 18.80 | 18.74 |
| PVC (pigment volume concentration) | 45.12 | 61.05 |
| VOC (volatile organic compds) | | |
| #/gal | 0 | 2.47 |
| gms/liter | 0 | 295.82 |
| Pigment weight | 66.23 | 66.44 |
| Pigment volume | 29.02 | 29.02 |

The pigment dispersion provided a useful tint base for latex and alkyd paints.

EXAMPLE 8

In a manner similar to Examples 1–3, a high concentration exterior yellow pigment dispersion at 63% PVC was produced using PEG as the vehicle.

| Block composition | | |
|---|---|---|
| Vehicle (pigment carrier) | PEG 400 | Ethylene glycol |
| Vehicle % | 10.00 | 10.00 |
| Water | 32.50 | 32.50 |
| Nonyl phenol ethyoxylate | 0 | 6.00 |
| Alkyl polyglucoside | 6.00 | 0 |
| Co-surfactants | 2.90 | 2.90 |
| Glycerine | 3.00 | 3.00 |
| Biocide | 0.30 | 0.30 |
| Hansa Yellow 74 | 45.30 | 45.30 |
| | 100.00% | 100.00% |
| Weight lbs. per gallon | 10.18 | 10.15 |
| PVC (pigment volume concentration) | 62.92 | 73.74 |
| VOC (volatile organic compds) | | |
| #/gal | 0 | 1.71 |
| gms/liter | 0 | 204.88 |
| Pigment weight | 45.21 | 45.35 |
| Pigment volume | 36.14 | 36.14 |

The pigment dispersion provided a useful tint base for latex and alkyd paints.

The merits of the pigmented tinting concentrate of this invention are illustrated above, but the scope of the invention is not intended to be limited except by the appended claims.

I claim:

1. An aqueous dispersed pigment concentrate tinting composition for tinting paint products, where the tinting composition contains tinting pigments and an organic vehicle for the tinting pigments, the improvement comprising:

the organic vehicle consisting of a linear polyethylene glycol polyether having a number average molecular weight between about 190 and 700, where the vehicle is essentially free of volatile organic compounds, and where the aqueous dispersed pigment tinting composition contains at least about 2% of non-ionic alkyl glycoside surfactant based on the total weight of pigment, where the PVC (pigment-volume-content) of the tinting composition is between about 20% and 70%.

2. The composition of claim 1 where the PVC is between about 20% and 45%.

3. The composition of claim 1 where the number average molecular weight of the glycol polyether is between about 300 and 600.

4. The composition of claim 1 where the alkyl glycoside comprises an alkyl group linked to a saccharide component containing one to five saccharide units.

5. The composition of claim 4 where the saccharide component comprises a mixture of monosaccharide and polysaccharide containing two to five saccharide units.

6. The composition of claim 5 where the saccharide component comprises saccharide units selected from a hexose ring and a pentose ring.

7. The composition of claim 4 where the alkyl group is linked to the saccharide component by an intermediate linkage selected from an ether linkage, an ester linkage, or a thio linkage.

8. The composition of claim 6 where the linkage is an ether linkage.

9. The composition of claim 6 where the linkage is an ester linkage.

10. The composition of claim 6 where the linkage is a thio linkage.

11. The composition of claim 4 where the alkyl group comprises an alkyl aliphatic chain having 8 to 16 carbon atoms.

12. The composition of claim 1 where the composition contains a non-ionic cosurfactant.

13. The composition of claim 12 where the PVC is above about 45% and the alkyl glycoside surfactant and the cosurfactant comprises between 6% and 10% by weight based on the weight of dry pigments.

14. An aqueous dispersed pigment tinting composition for tinting paint products where the composition contains tinting pigments and an organic vehicle for the tinting pigments, the improvement comprising:

the organic vehicle consisting of a polyethylene glycol polyether having a number average molecular weight between about 200 and 600, where the vehicle is essentially free of volatile organic compounds, and where the aqueous dispersed pigment tinting composition contains at least about 2% of non-ionic alkyl polyglycoside surfactant based on the total weight of pigment, where the PVC (pigment-volume-content) is between about 20% and 45%.

15. The composition of claim 14 where the polyethylene glycol comprises a linear polymer formed by addition homopolymerization of ethylene oxide to produce a linear polymer having on the average between about 4 and 17 polymerized ethylene oxide molecule.

16. The composition of claim 15 where the linear polymer has an average of between 6 and 9 polymerized ethylene oxide molecules.

17. The composition of claim 15 where the linear polymer has an average of between 4 and 14 polymerized ethylene oxide molecules.

18. The composition of claim 14 where the composition contains between about 2.5% and 7% by weight non-ionic alkyl polyglycoside surfactant based on the weight of pigment.

19. The composition of claim 14 where alkyl polyglycoside contains an alkyl aliphatic chain having 8 to 16 carbon atoms.

20. The composition of claim 14 where the polyglycoside comprises a mixture of monoglycoside, diglycoside and triglycoside.

21. The composition of claim 14 where the polyglycoside comprises by weight between about 50% to 70% monoglycoside, between about 20% and 30% diglycoside, between 5% and 10% triglycoside, and between 0% and 10% higher polyglycosides.

22. The composition in claim 14 where the composition contains a non-ionic co-surfactant.

23. The composition in claim 14 where the alkyl polyglycoside surfactant and co-surfactant comprise between 6% and 10% by weight based on the weight of dry pigments.

24. The composition in claim 14 where the pigment tinting composition is mixed with an aqueous latex paint to provide a stable tinted paint.

25. The composition of claim 14 where the pigment tinting composition is uniformly mixed with a solvent containing paint to provide a stable tinted paint.

26. The composition of claim 14 where the pigment tinting composition is uniformly dispersible in either an aqueous latex paint or a non-aqueous solvent paint.

27. The composition of claim 1 where the average molecular weight of the polyethylene glycol polyether is between about 200 and 600.

28. The composition of claim 1 where the polyethylene glycol polyether vehicle contains less than 0.2% by weight organic glycol having a boiling point below about 285° C.

29. The composition of claim 14 where the polyethylene glycol polyether vehicle contains less than 0.2% by weight organic glycol having a boiling point below about 285° C.

* * * * *